United States Patent [19]

Bissardon et al.

[11] Patent Number: 4,594,154

[45] Date of Patent: Jun. 10, 1986

[54] SELF-CONTAINED DEVICE FOR STERILIZING WATER

[75] Inventors: André Bissardon, Lyons; Jean-Pierre Gourlandt, Le Creusot; Gilles Chastan, Bron; Marcel Lusseau, Vaulx en Velin, all of France

[73] Assignee: CFEC, Paris, France

[21] Appl. No.: 636,896

[22] Filed: Aug. 2, 1984

[51] Int. Cl.⁴ ............................................. C02F 1/68
[52] U.S. Cl. ................................. 210/105; 210/134; 210/139; 210/198.1
[58] Field of Search ............... 210/101, 105, 192, 134, 210/137, 139, 143, 198.1, 199

[56] References Cited

U.S. PATENT DOCUMENTS 2,929,393 3/1960 Wallace et al. ............... 210/105 X
2,970,821 2/1961 Axt ................................ 210/192 X
3,274,094 9/1966 Klein ............................. 210/101 X
3,997,631 12/1976 Matsuoka et al. ............. 210/192 X
4,017,393 4/1977 Foggett ............................. 210/101

Primary Examiner—Thomas Wyse
Attorney, Agent, or Firm—William A. Drucker

[57] ABSTRACT

A self-contained device for sterilizing water is provided comprising a sterilizing product injection apparatus supplied with power by electric batteries so as to cause injection of the sterilizing product into a pipe transporting water to be treated, a water meter mounted in said pipe and having a head capable of generating a pulse each time the meter has recorded the flow of a predetermined amount of water, and an electric power regulator controlled by said pulses and which, whenever it receives a pulse, lets the current from the battery pass in the form of a short duration signal, the regulator interrupting the current from the battery between the pulses emitted by the meter.

5 Claims, 4 Drawing Figures

SELF-CONTAINED DEVICE FOR STERILIZING WATER

BACKGROUND OF THE INVENTION

The present invention relates to a device for applying, independently and over a relatively long period of time, sterilization treatment at water points situated in isolated areas where it is impossible to use electric energy from the national grid.

Known sterilization devices of the chemical type have the drawback either of being unreliable or of requiring frequent maintenance.

It is true that it is possible to use conventional electric equipment which would be supplied by batteries, but the independence of such equipment would only be a few weeks, even a few days. Now, for such a system to be economic, it must be able to work independently for at least six months.

SUMMARY OF THE INVENTION

The present invention aims then at overcoming the above mentioned disadvantages of sterilization devices of the prior technique and provides a sterilization device of the type comprising, on the one hand, an apparatus for injecting a sterilizing product having electric control means which may be energized by electric batteries so as to cause injection of the sterilizing product into a pipe conveying water to be treated and, on the other hand, a water meter mounted on said pipe and having a head capable of generating an impulse whenever the meter has recorded the passage of a predetermined amount of water, said sterilization device further comprising an electric power regulator controlled by said pulses and which, whenever it receives a pulse, lets the current from the battery pass in the form of a short duration signal which actuates said control means so that a dose of sterilizing product is injected into the pipe, the regulator interrupting the current from the battery between the pulses emitted by the meter.

With the regulator therefore the current consumption of the control means of the injection apparatus is reduced to a minimum and any consumption between two pulses is suppressed. The self-contained working of the device of the invention is thus appreciably increased.

In a particular embodiment of the invention, the injection apparatus is formed by a conventional feed regulating pump and the sterilizing product used is soda hypochlorite.

In a variant, the injection apparatus is formed by a hydraulic control valve inserted in a service pipe by-passed to the water pipe to be treated and through which flows a small fraction of the delivery of the pipe, said valve being associated with an electromagnetic closure valve and with an electromagnetic opening valve controlled by the regulator, so that when a pulse is emitted, these valves are actuated so as to let a predetermined amount of service water pass through the valve, which water passes through a suction device, such as a hydro-ejector where it is mixed with a gaseous sterilizing product, for example chlorine, the chlorinated water thus obtained being introduced into the water pipe downstream of the connection point of the service pipe to the water intake pipe.

The control means comprise a first relay which acts on the opening electro-magnetic valve of the hydraulic control valve for a pedetermined time, a second relay which defines the opening time of the hydraulic valve, so the duration of injection of the sterilizing product, a third relay which acts, after said duration, on the electro-magnetic closure valve of the hydraulic valve and a device for resetting the system.

Because of the provision of the resetting device, if at the end of a cycle the electric contact remains closed, a new cycle cannot begin so that the power consumption of the system will be zero and a new dose of product is not dispensed. Similarly, if, following a failure of the electric contact a series of rapid pulses is emitted, a single cycle is executed.

Thus, the regulator of the invention uses the power of the batteries rationally since its consumption is zero between the cycles and is reduced to the strict minimum during the cycles. Thus the electric power supply circuit may be calculated so that the total power of the batteries may be spread out in cycles over a relatively long period of time, for example of the order of six months.

BRIEF DESCRIPTION OF THE DRAWINGS

The invention will now be described in detail with reference to the accompanying drawings in which.

DESCRIPTION OF THE PREFERRED EMBODIMENTS

Figure 1:
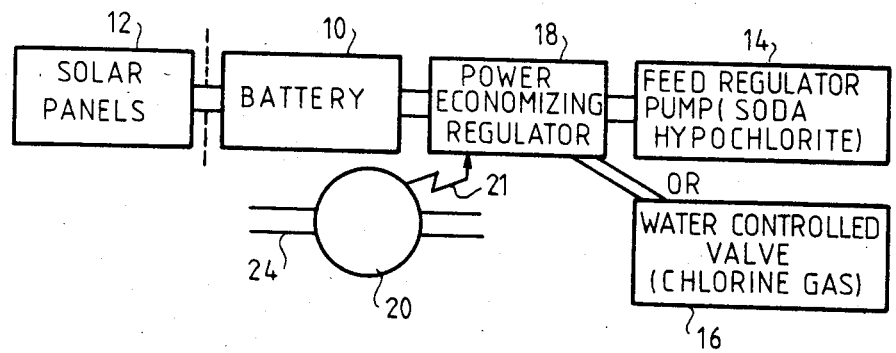
FIG. 1 is a block diagram of a water sterilization chain.

With reference to FIG. 1, the sterilization device comprises electric batteries 10, equipped possibly with integrated solar collectors 12. These batteries supply with power the control means of a sterilizing product injection device which may be formed either by a feed regulator pump 14, or by a hydraulic control valve 16, or by any appropriate known apparatus. The sterilizing product dispensed by the feed regulator pump is preferably soda hypochlorite, whereas that used with the hydraulic control valve is chlorine gas.

In accordance with the basic notion of the invention between battery 10 and injection device 14 or 16 is interposed a power economizing regulator 18 driven by a water meter 20, with emitting head 21, mounted in the water pipe to be treated 24. The purpose of this meter, which may be likened to an electric switch, is to close a contact whenever a predetermined amount of water has flowed through the pipe, said contact causing the regulator to emit an electric pulse for triggering on the control cycle of the injection apparatus for a very short and adjustable period of time.

Thus, the regulator prevents any consumption of electricity during the interval between two treatment cycles and limits the consumption to a minimum value during injection sequences of the sterilizing product.

Figure 2:
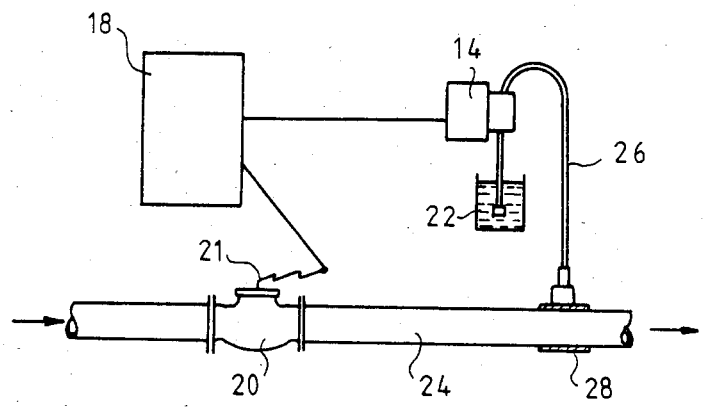
FIG. 2 is a diagram of the soda hypochlorite sterilization device using a feed regulator pump.

FIG. 2 shows one embodiment of the sterilization device using a feed regulator pump 14 capable of dispensing doses of soda hypochlorite which it takes from a reservoir 22. The water meter 20 is mounted in an inlet pipe 24 feeding the water to be treated. The regulation cabinet 18 also contains the batteries. When the emitting head 21 of the counter emits a pulse, the regulator sends the order to the pump to inject a dose of soda hypochlorite into pipe 24. This dose is injected through an injection tube 26 which is fixed to the pipe by a collar 28 and which opens thereinto downstream of meter 20.

Figure 3:
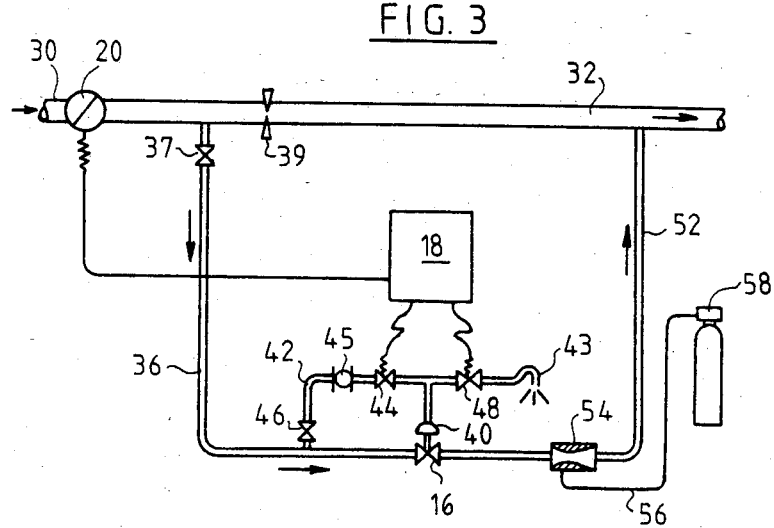
FIG. 3 is a diagram of the chlorine gas sterilization device comprising a hydraulic control valve.

FIG. 3 shows a sterilization device using a hydraulic control valve. This device comprises an intake pipe 30 which is divided into a main pipe 32 and a service pipe 36 which is connected to the hydraulic control valve 16 through a manual adjustment valve 37 for bypassing a service flow equal to a small fraction of the total delivery. This is measured by the emitting head meter 20 which is mounted in the intake pipe 30 upstream of the bypass.

The hydraulic control valve used may be of any known type, providing that it is compatible with the electromagnetic control valves. An example will be described hereafter of a valve which may be used with the device of the invention. Valve 16 comprises a body containing a pressure chamber not shown, in which is slidingly mounted a pilot valve member 40 and which may either by pressurized through a bypass 42 connected to the service pipe 36, the pilot valve member 40 then being urged during closure position of the hydraulic valve, or vented through pipe 43, the pilot valve member then being urged to its open position, which allows the service water to flow through the hydraulic valve.

In the bypass 42 are mounted an electromagnetic closure valve 44, a filter 45 and a manual adjustable cock 46 for diverting towards the bypass a propulsive flow equal to a small fraction of the service flow. In pipe 43 is mounted an electro-magnetic opening valve 48. Pipe 52 which leaves valve 16 passes through a hydro-ejector 54 to the input of which is connected pipe 56 from a depression chlorometer 58.

The main pipe 32 is equipped with a diaphragm or pressure stabilizer 33 for maintaining sufficient pressure in pipe 36 so that the hydro-ejector 54 operates correctly.

The electro-magnetic valves 44 and 48 are controlled by the regulator 18 which is itself driven by the impulses from the meter 20 with emitting head. At each pulse, a chlorination cycle is triggered off. This cycle comprises three periods.

First period: electro-magnetic opening valve 48 is energized for a variable time, between 0.5 and 1 second. The pressurized water which is imprisoned in the pressure chamber of the valve is then discharged to the atmosphere and the valve opens. The service water begins to pass through the hydro-ejector 54 where it is mixed with chlorine gas which is sucked in by the depression which reigns at the inlet of the hydro-ejector.

Second period: a time delay between 0 and 40 seconds for maintaining the valve in the open state; this time delay regulates then the chlorination time. The dose of chlorinated water thus formed is injected into pipes 32.

Third period: the electro-magnetic valve 44 is energized for a variable time, between 0.5 and 1 second. The pressure of the service pipe 36 is then communicated to the pilot valve member 40 of the hydraulic valve 16, which causes closure thereof and so stopping of the chlorination.

The device is then returned to its initial state and waits for a new pulse so as to begin a new cycle.

Figure 4:
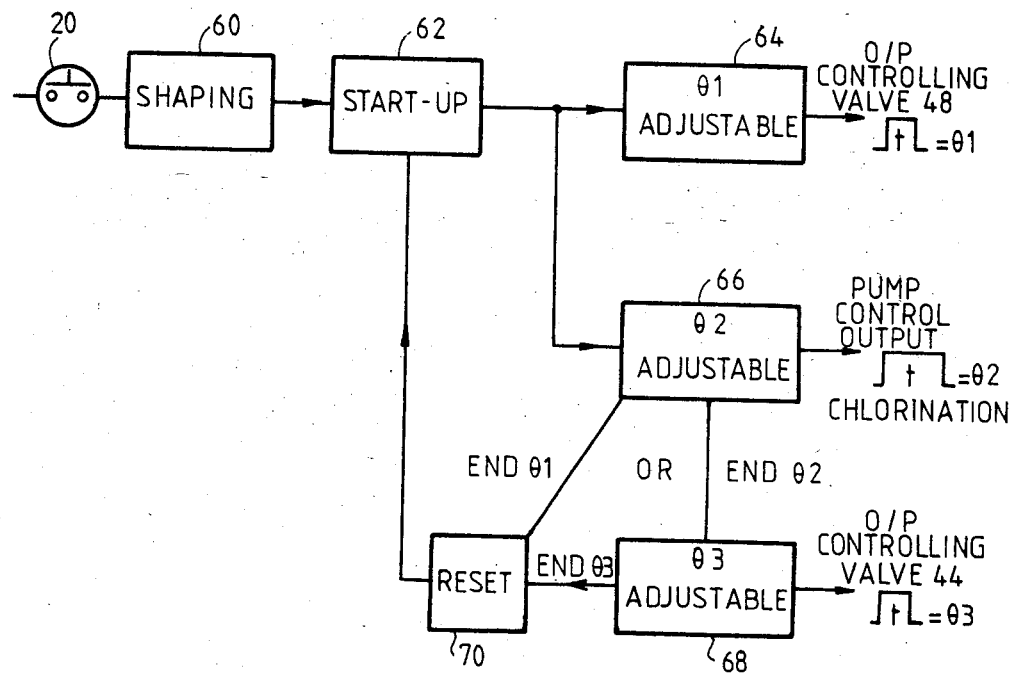
FIG. 4 is a simplified diagram of the operation of the sterilization device.

The operation of the device will now be described with reference to the simplified diagram of FIG. 4. The emitting head meter is shown schematically in this Figure by an electric contact 20 which may be either in the open position or in the closed position. The contact is normally in the open position and is closed whenever a predetermined amount of water has passed through the pipe transporting the water to be treated.

When contact 20 is open, the regulator does not consume any power and the treatment is stopped.

When the contact is closed, a current flows for a short time through the winding of a first relay, not shown, which triggers off the treatment cycle. This current is transformed in a shaping circuit 60 into a square wave signal, which acts on a starting up device 62.

If the injection apparatus is formed by a hydraulic control valve, two relays 64, 66 are actuated simultaneously, the first one acting on the electro-magnetic opening valve 48 of the hydraulic control valve (FIG. 3) for a time $\theta_1$ which may be adjusted to about 0.5 second, the second one defining the time $\theta_2$ for injection of the chlorinated water. After the time $\theta_2$, a third relay 68 is actuated so as to act on the electro-magnetic closure valve 44 of the hydraulic valve, for an adjustable time $\theta_2$ of about 0.5 second, then a resetting device 70 is actuated. In this position, if at the end of a cycle contact 20 has remained closed a new cycle cannot begin. Similarly, if a series of rapid pulses is emitted by the contact, only one cycle will be executed.

If it is a question of a feed regulator pump, only relay 66 is actuated for an adjustable time $\theta_2$ between 0.5 and 1 second, which time is required for injecting the sterilizing product, then the reset device 70 is actuated.

The power requirements of the sterilization device of the invention will be calculated in the particular case of the following numerical application:

| | |
|---|---|
| voltage of the batteries | 24 volts |
| current drawn by the regulator at 24 volts | 200 mA |
| current drawn by the feed regulator pump at 24 volts | 1 A |
| current drawn by an electromagnetic valve at 24 volts | 85 mA |

From these data, the requirements are worked out as follows:

| Power requirements for a feed regulator pump | |
|---|---|
| Duration of a cycle | $\theta_2 = 0.5$ second |
| Consumption of the regulator | 100 mA.s |
| Consumption of the feed regulator pump | 500 mA.s |
| TOTAL | 600 mA.s | which is equivalent to $0.6/3600 = 0.166 \times 10^{-3}$ Ah at 24 volts.

| Power requirements for a hydraulic valve | |
|---|---|
| Duration of opening and closure of the electromagnetic valves | $\theta_1 = \theta_3 = 0.5$ sec. |
| Duration of injection of the sterilizing product | 20 seconds |
| Consumption of the two electro-magnetic valves | $2 \times 0.5 \times 85 = 85$ mA.s |
| Consumption of the regulator | $20 \times 200 = 4$ A.s |
| TOTAL | 4.085 A.s | which is equivalent to $4.085/3600 = 1.13 \times 10^{-3}$ A.h at 24 volts.

If 63 Ah batteries are used we will therefore theoretically obtain:
with a feed regulator pump $$\frac{63}{0.166 \times 10} - 3 \simeq 378,000$$

possible cycles and
with a hydraulic valve $$\frac{63}{1.13 \times 10} - 3 \simeq 55,000$$

cycles for an injection time of 20 seconds.

If independent working is required for six months, this gives:
2100 cycles per day for the feed regulator pump and
300 cycles per day for the hydraulic control valve.

Similarly, theoretical curves can be plotted giving the independent working time of the device as a function of the desired number of cycles per day.

What is claimed is:

1. Apparatus for introduction of a sterilizing agent into a water main, said apparatus comprising:
   electrically powered injector means, said injector means being connected to said water main and having a first electric control input, said injector means injecting an adjustable quantity of sterilizing agent into the water main in a cycle time interval which is initiated each time a first electrical control signal is applied to said first control input;
   electrically powered meter means, mounted in said water main, for continuously measuring the flow of water through the said water main, said meter means having a first electrical signal output and generating a second electrical control signal on said first output each time a predetermined volume of water has flown through the said water main; and
   electrically powered control means having a second control input connected to the said first signal output, said control means having a second signal output which is connected to the said first control input, said electrically powered control means generating a first control signal on said second signal output each time the said second control signal has been applied to said second control input.

2. The apparatus as claimed in claim 1, wherein the injector means comprise: a feed regulator pump having an inlet and an outlet; a tank containing the sterilizing agent in the liquid state; means for taking the sterilizing agent from the tank to the feed regulator pump inlet and means connected to the feed regulator pump outlet for injecting the said sterilizing agent from the said outlet to a point of the water main located downstream of said motor means.

3. The apparatus as claimed in claim 1, wherein the said control means further have a third signal output on which a third control signal is generated after a time delay which equals the said cycle time interval, each time said second control signal is applied to the said second control input of the control means, and said apparatus further comprises a service pipe by-pass connecting a first point of the water main located downstream of the meter means to a second point of the water main located downstream of the first point, the said injector means comprise hydro-ejector means mounted in said by-pass, a tank containing the sterilizing agent under the gas state and means for introducing the said sterilizing agent from the said tank into the hydro-ejector means each time water is flowing through the hydro-ejector and the said control means comprise hydraulic control valve means mounted in said by-pass upstream of said hydro-ejector means and electromagnetic valve means cooperating with said hydraulic control valve means for allowing the water from said by-pass to flow through the said hydraulic control valve means in an actuated state of said hydraulic control valve means and preventing the water from said by-pass to flow through the said hydraulic control valve means in a disabled state of said hydraulic control valve means, said electromagnetic valve means having third and fourth control inputs which are respectively connected to the said second and third signal outputs of the said control means and switching the said hydraulic control valve means in the said actuated state when the said first control signal is present on the said third control input, whereas the said electromagnetic valve means switch the said hydraulic control valve means in the said disabled state when the said third control signal is present on the said fourth control input.

4. The apparatus as claimed in claim 1, wherein said control means further comprise switch means having an input connected to the said first signal output of the meter means, an output and a further resetting input; first and second relay means having energizing inputs respectively connected to the said output of the switch means and respectively generating the said first and third control signals, the first relay means having the said second signal output and the second relay means having the said third signal output and further having a fourth signal output, and resetting means, connecting the said fourth signal output of the second relay means to the resetting input of the switch means.

5. The apparatus as claimed in claim 1, wherein said injector means, said control means and said meter means are electrically powered by solar battery means.

* * * * *

UNITED STATES PATENT AND TRADEMARK OFFICE
CERTIFICATE OF CORRECTION

PATENT NO. : 4,594,154
DATED : June 10, 1986
INVENTOR(S) : Andre Bissardon et al.

It is certified that error appears in the above-identified patent and that said Letters Patent are hereby corrected as shown below:

On the title page, item /73/ should read

-- (73) Assignee: C I F E C
                 Paris, France --.

Signed and Sealed this

Sixteenth Day of September 1986

[SEAL]

Attest:

DONALD J. QUIGG

Attesting Officer      Commissioner of Patents and Trademarks